UNITED STATES PATENT OFFICE.

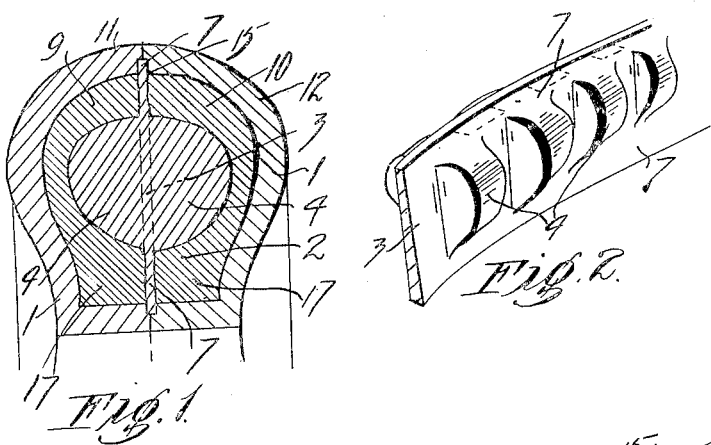
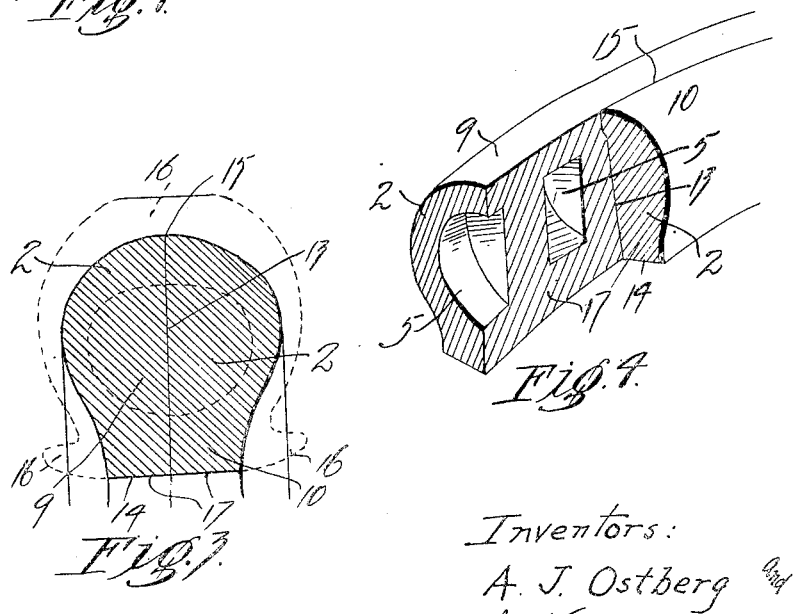

ANDERS JOHN OSTBERG AND ALBERT KENNY, OF RICHMOND, NEAR MELBOURNE, VICTORIA, AUSTRALIA.

MANUFACTURE OF RESILIENT TIRES.

1,367,496.   Specification of Letters Patent.   Patented Feb. 1, 1921.

Application filed June 5, 1919. Serial No. 302,055.

*To all whom it may concern:*

Be it known that we, ANDERS JOHN OSTBERG and ALBERT KENNY, both subjects of the King of Great Britain, and residents of Richmond, near Melbourne, in the State of Victoria and Commonwealth of Australia, have invented certain Improvements in the Manufacture of Resilient Tires, of which the following is a specification.

This invention relates to improvements in the manufacture of tires.

Hitherto solid rubber or like resilient tires have been difficult to manufacture owing to the fact that the air cavities or chambers thereof were formed around the outside of the walls or sides of a base or core, and an outer cover was then vulcanized to the cellular core to complete the tire.

This invention has been devised in order to provide a resilient tire which is cheap in construction and wherein air cells are arranged within and spaced around the base or core, the method of construction being such, that, to allow of the withdrawal of the mold after vulcanizing, the base or core is divided peripherally from the inner surface centrally through the core, the divided portions being joined together by an adhesive solution or by vulcanizing as desired.

After the withdrawal of the mold which is substantially ring-shaped and which has on one or both sides projections to form the air chambers, of suitable shape, arranged diagonally or vertically as desired, the divided portions of the base or core are joined together by vulcanizing or by a suitable adhesive solution so forming a complete resilient core having air spaces formed therein, the air spaces or chambers being formed transversely or circumferentially within the core and are vertical, diagonal, staggered or of any other arrangement as desired.

In order that the invention may be more readily understood it will now be described with reference to the accompanying drawings, in which—

Figure 1 is a view in transverse section illustrating the improved method of construction.

Fig. 2 is a view in perspective of the inner mold embodied in the invention.

Fig. 3 is a view in transverse section illustrating the completed inner resilient core embodied in the invention.

Fig. 4 is a view in perspective showing the completed inner core partly in section.

According to this invention the usual outer mold 1 in two halves and of the shape of the resilient core or base 2 is formed in the usual way, being fitted around an inner mold 3 having projections 4 of the shape it is desired to form the air chambers 5 in the core.

The mold 3 for the air chambers 5 is arranged within the outer mold 1 and consists of a substantially thin ring having the mold formations 4 for the air spaces or chambers formed around both sides thereof. The core 2 may be completely divided by the rims or extensions 7 on the top and bottom of the inner mold 3 which extends vertically and centrally into the top and bottom of the outer mold 1, the two halves 9, 10 of the completed core ultimately being joined by adhesive solution or by vulcanizing.

The external or outer mold 1 is formed in two halves 11, 12 and is arranged in position in the usual way. The core 2 is formed with a projection 17, the surface 14 of which is adapted to rest upon the wheel rim; said projection being so shaped that it is pinched by the beads of the cover 16 when in position on the wheel rim.

In the manufacture of the improved tire, the material to form the core is placed in the mold and then vulcanized.

After the vulcanization of the core, the outer mold 1 is removed, leaving the resilient core 2 upon the inner mold 3, and the core by this method is divided as at 13 from the inner surface 14 to a point 15 completely through the said core 2 as illustrated in Figs. 1, 3 and 4. The resilient core 2 is then completed by closing the divided walls 13 by vulcanizing or by adhesive solution, thus providing a resilient rubber core 2 having spaced airtight chambers 5 arranged therein.

The core 2 is then arranged within an outer cover 16, or in the process of manufacture may be vulcanized to the cover, if so desired. The width of the core and its cover must necessarily be wider than the wheel rim to which it is to be fitted to enable them to be pressed or pinched into position and so be rigidly held in the said rim.

What we do claim as our invention and desire to secure by Letters Patent, is—

1. A process of manufacturing resilient tires, comprising arranging the material to form the core of the tire around an inner mold ring having projections around its walls to produce air spaces in the core and also having upper and lower extensions to divide the core centrally and vertically into two counterpart sections; disposing the mold ring and core material within an outer mold; vulcanizing the core; removing the core from the molds; securing the core sections together; and fitting a cover to the core.

2. A process of manufacturing resilient tires, comprising arranging the material to form the core of the tire around an inner mold ring having projections around its walls to produce air spaces in the core and also having means to split the core longitudinally; disposing the mold ring and core material within an outer mold; vulcanizing the core; removing the core from the molds; sealing together the walls of the split in the core; and fitting a cover to the core.

Signed at Melbourne, in the State of Victoria, Australia, this 28th day of April, 1919.

ANDERS JOHN OSTBERG.
  ALBERT KENNY.

In the presence of—
 ANN E. EDWARDS,
 JEANNE BOUSTIERE.